United States Patent
Shijo et al.

(10) Patent No.: US 10,992,181 B2
(45) Date of Patent: Apr. 27, 2021

(54) POWER TRANSMITTING APPARATUS, POWER RECEIVING APPARATUS, CONTROL APPARATUS, AND WIRELESS POWER TRANSFER SYSTEM

(71) Applicant: KABUSHIKI KAISHA TOSHIBA, Tokyo (JP)

(72) Inventors: Tetsu Shijo, Tokyo (JP); Akiko Yamada, Yokohama (JP); Kohei Onizuka, Tokyo (JP); Fumi Moritsuka, Kawasaki (JP); Hiroaki Ishihara, Kawasaki (JP); Noriaki Oodachi, Kawasaki (JP); Shuichi Obayashi, Yokohama (JP); Hiroki Kudo, Kawasaki (JP); Kenichirou Ogawa, Tokyo (JP); Shoji Otaka, Yokohama (JP); Hiroki Shoki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 46 days.

(21) Appl. No.: 15/433,045

(22) Filed: Feb. 15, 2017

(65) Prior Publication Data
US 2017/0170690 A1 Jun. 15, 2017

Related U.S. Application Data

(62) Division of application No. 13/738,151, filed on Jan. 10, 2013, now Pat. No. 9,608,453.

(30) Foreign Application Priority Data

Mar. 26, 2012 (JP) .............................. JP2012-069769

(51) Int. Cl.
*H03H 7/40* (2006.01)
*H02J 50/12* (2016.01)
(Continued)

(52) U.S. Cl.
CPC ............ *H02J 50/12* (2016.02); *B60L 53/122* (2019.02); *B60L 53/124* (2019.02);
(Continued)

(58) Field of Classification Search
None
See application file for complete search history.

(56) References Cited

U.S. PATENT DOCUMENTS 8,089,245 B2 1/2012 Kato et al.
8,305,036 B2 11/2012 Terao et al.
(Continued)

FOREIGN PATENT DOCUMENTS

JP 61081204 U 5/1986
JP 2005319983 A 11/2005
(Continued)

OTHER PUBLICATIONS

Japanese Office Action dated Feb. 6, 2015, issued in counterpart Japanese Application No. 2012-069769.
(Continued)

*Primary Examiner* — Jared Fureman
*Assistant Examiner* — Esayas G Yeshaw
(74) *Attorney, Agent, or Firm* — Holtz, Holtz & Volek PC

(57) ABSTRACT

A power transmitting apparatus including a power supply to generate AC power; a power transmitting inductor to transfer the AC power to a power receiving apparatus through magnetic coupling with a power receiving inductor in the power receiving apparatus; a mutual coupling adjusting unit to adjust a relative position between the power transmitting inductor and the power receiving inductor; and a control unit to control the mutual coupling adjusting unit based on a mutual coupling coefficient between the power transmitting inductor and the power receiving inductor. The control unit controls the mutual coupling adjusting unit so that the
(Continued)

mutual coupling coefficient falls within a predetermined range and an upper limit of the predetermined range is a value less than a maximum of the mutual coupling coefficient between the power transmitting inductor and the power receiving inductor.

17 Claims, 18 Drawing Sheets

(51) Int. Cl.
| | |
|---|---|
| H02J 50/90 | (2016.01) |
| H02J 50/80 | (2016.01) |
| H02J 5/00 | (2016.01) |
| H04B 5/00 | (2006.01) |
| B60L 53/36 | (2019.01) |
| B60L 53/37 | (2019.01) |
| B60L 53/122 | (2019.01) |
| B60L 53/124 | (2019.01) |
| B60L 53/126 | (2019.01) |
| H02J 4/00 | (2006.01) |
| H02J 50/60 | (2016.01) |

(52) U.S. Cl.
CPC .......... *B60L 53/126* (2019.02); *B60L 53/36* (2019.02); *B60L 53/37* (2019.02); *H02J 4/00* (2013.01); *H02J 5/005* (2013.01); *H02J 50/60* (2016.02); *H02J 50/80* (2016.02); *H02J 50/90* (2016.02); *H04B 5/0037* (2013.01); *H04B 5/0081* (2013.01); *B60L 2210/10* (2013.01); *B60L 2210/30* (2013.01); *B60L 2240/36* (2013.01); *B60L 2250/16* (2013.01); *Y02T 10/70* (2013.01); *Y02T 10/7072* (2013.01); *Y02T 10/72* (2013.01); *Y02T 90/12* (2013.01); *Y02T 90/14* (2013.01)

(56) References Cited

U.S. PATENT DOCUMENTS

| | | | | |
|---|---|---|---|---|
| 8,587,154 | B2* | 11/2013 | Fells | H01F 38/14 |
| | | | | 307/104 |
| 8,610,399 | B2 | 12/2013 | Takada et al. | |
| 2011/0199028 | A1 | 8/2011 | Yamazaki et al. | |
| 2011/0285349 | A1 | 11/2011 | Widmer et al. | |
| 2012/0007437 | A1* | 1/2012 | Fells | H04B 5/0037 |
| | | | | 307/104 |
| 2012/0146580 | A1* | 6/2012 | Kitamura | G01V 3/102 |
| | | | | 320/108 |
| 2012/0153739 | A1* | 6/2012 | Cooper | H02J 50/12 |
| | | | | 307/104 |
| 2012/0161537 | A1* | 6/2012 | Kamata | H01F 38/14 |
| | | | | 307/104 |
| 2012/0161696 | A1* | 6/2012 | Cook | B60L 55/00 |
| | | | | 320/108 |
| 2012/0217818 | A1* | 8/2012 | Yerazunis | H02J 50/40 |
| | | | | 307/104 |
| 2012/0235509 | A1 | 9/2012 | Ueno et al. | |
| 2012/0294045 | A1* | 11/2012 | Fornage | H02M 7/217 |
| | | | | 363/17 |
| 2013/0002034 | A1 | 1/2013 | Onizuka et al. | |
| 2013/0147279 | A1* | 6/2013 | Muratov | H02J 5/005 |
| | | | | 307/104 |
| 2014/0001879 | A1* | 1/2014 | Van Wageningen | G01R 21/00 |
| | | | | 307/104 |
| 2014/0191819 | A1* | 7/2014 | Suzuki | H02J 7/025 |
| | | | | 333/17.3 |
| 2014/0342833 | A1* | 11/2014 | Robbins | G07F 17/323 |
| | | | | 463/42 |
| 2016/0043563 | A1* | 2/2016 | Porat | H02J 7/025 |
| | | | | 307/104 |
| 2017/0018971 | A1* | 1/2017 | Oshima | H02J 50/10 |

FOREIGN PATENT DOCUMENTS

| | | |
|---|---|---|
| JP | 2008172874 A | 7/2008 |
| JP | 2009188131 A | 8/2009 |
| JP | 2009247194 A | 10/2009 |
| JP | 2011188733 A | 9/2011 |
| JP | 2012034468 A | 2/2012 |
| JP | 2012075199 A | 4/2012 |
| JP | 2013530668 A | 7/2013 |

OTHER PUBLICATIONS

Japanese Office Action dated Jun. 27, 2014 in counterpart Japanese Application No. 2012-069769.
Japanese Office Action dated Oct. 31, 2014, issued in counterpart Japanese Application No. 2012-069769.
Kurihata, et al., "Rainfall Recognition in Various Conditions by In-Vehicle Camera Image for Driver Assistance", Graduate School of Information Science, Nagoya University, Japan; Denso Corporation, Japan., Mar. 10, 2006, pp. 55-60.

* cited by examiner

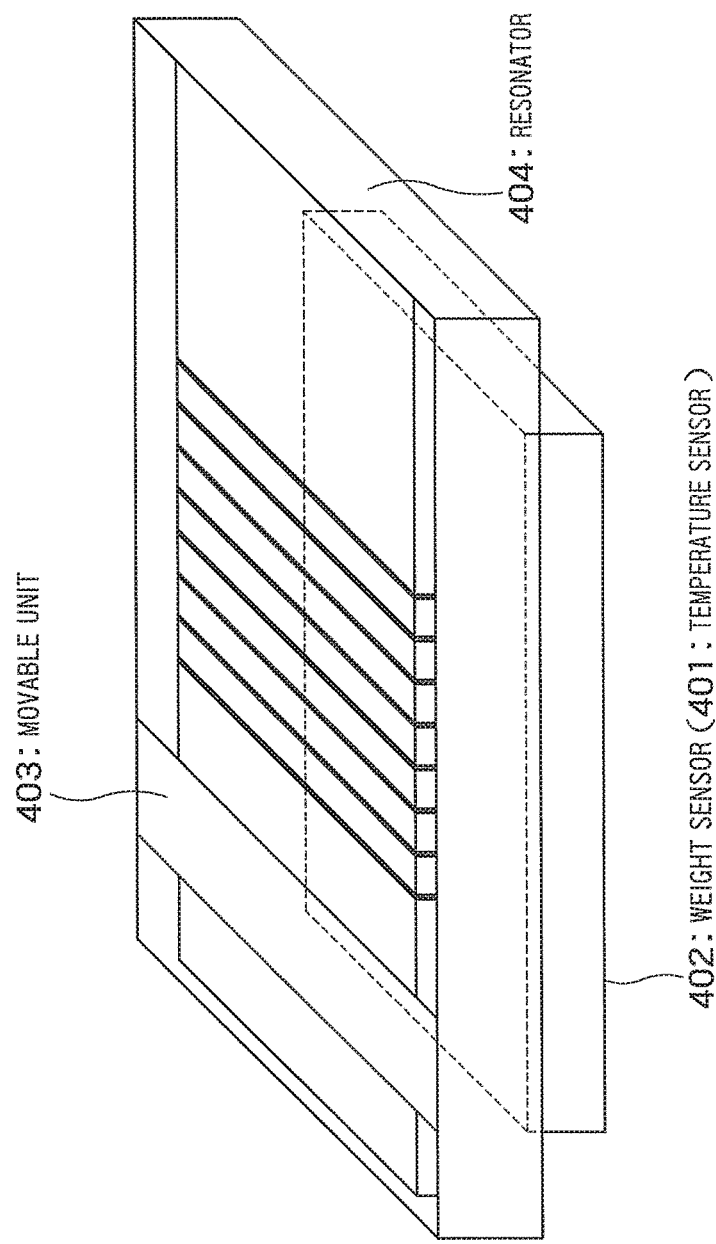
F I G. 20

POWER TRANSMITTING APPARATUS, POWER RECEIVING APPARATUS, CONTROL APPARATUS, AND WIRELESS POWER TRANSFER SYSTEM

CROSS-REFERENCE TO RELATED APPLICATIONS

This application is a Divisional application of U.S. Ser. No. 13/738,151, filed Jan. 10, 2013, which is based upon and claims the benefit of priority from the prior Japanese Patent Application No. 2012-69769, filed on Mar. 26, 2012, the entire contents of both of which are incorporated herein by reference.

FIELD

Embodiments described herein relate to a power transmitting apparatus, a power receiving apparatus, a control apparatus, and a wireless power transfer system, and, for example, relate to transmission power control.

BACKGROUND

There is a wireless power transfer system that wirelessly transfers power between coils, using the coupling coefficient or mutual inductance between the coils. When power is transferred by resonating the resistance and conductance of the coils, a higher maximum value of transfer efficiency between the coils is obtained as a product of the coupling coefficient k between the coils and the Q value of the coils becomes higher.

To increase the transfer efficiency between the coils, there is also known a technique of performing control such that the coils are operated to detect the positions of the coils, by which the distance between the coils is minimized.

The value of coupling coefficient between the coils where wireless transfer is performed varies depending on the shape of the coils, etc., even at the same distance between the coils. If the coupling coefficient between the coils changes significantly, then even if the same power is to be transmitted, there is a need to change the voltage on the power transmitting side or change the voltage conversion ration ratio of the DC-DC converter on the receiving side.

BRIEF DESCRIPTION OF THE DRAWINGS

FIG. 20 is a diagram illustrating still another exemplary configuration of a mutual coupling adjustment mechanism.

DETAILED DESCRIPTION

According to some embodiments, there is provided a power transmitting apparatus including: a power supply, a power transmitting inductor, a mutual coupling adjusting unit and a control unit.

The power supply generates AC power.

The power transmitting inductor transfers the AC power to a power receiving apparatus through magnetic coupling with a power receiving inductor in the power receiving apparatus.

The mutual coupling adjusting unit adjusts a relative position between the power transmitting inductor and the power receiving inductor.

The control unit controls the mutual coupling adjusting unit, based on a mutual coupling coefficient between the power transmitting inductor and the power receiving inductor.

Hereafter, embodiments will be described more specifically with reference to the drawings.

Figure 1:
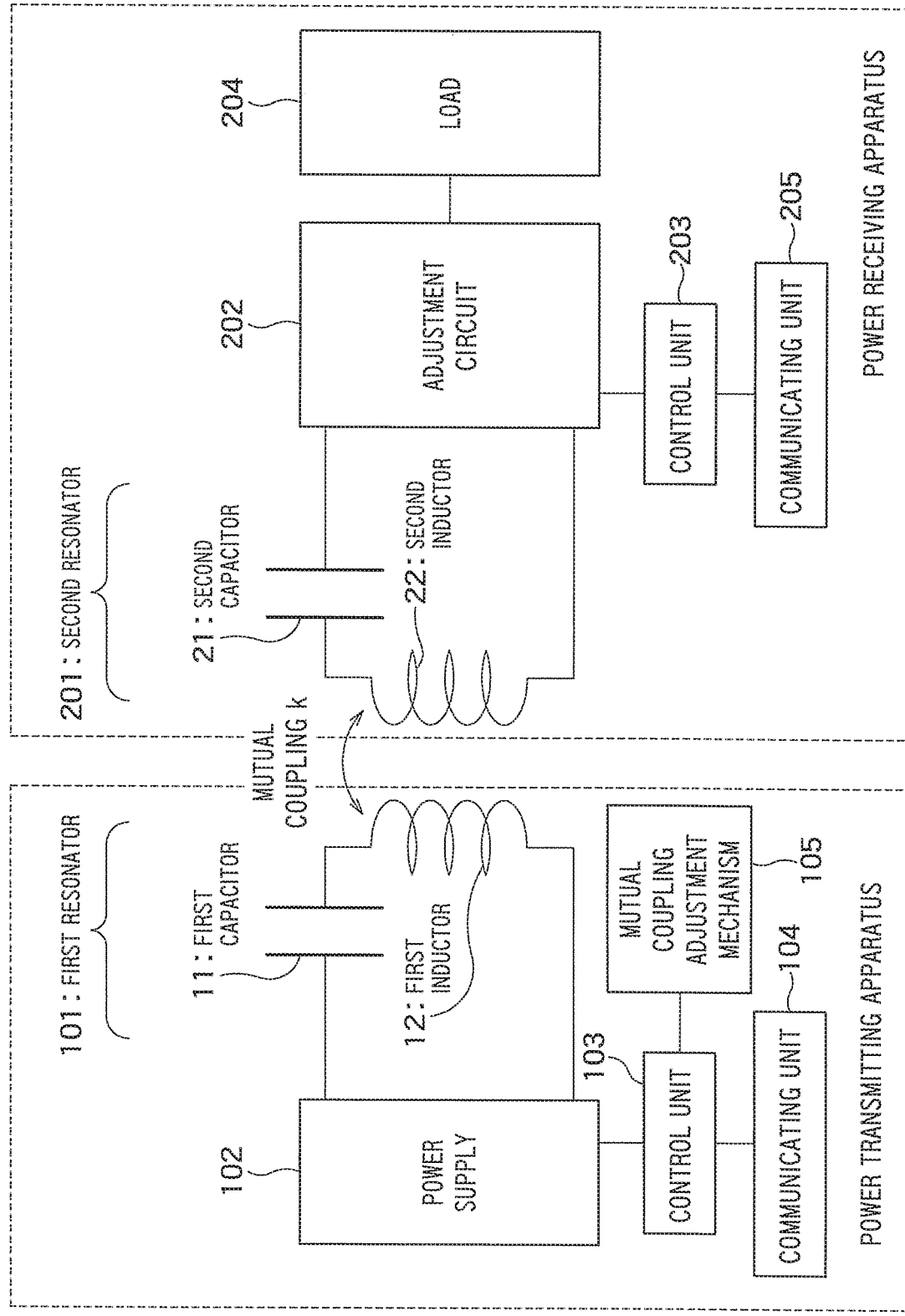
FIG. 1 is a diagram illustrating a wireless power transfer system according to a first embodiment.

FIG. 1 illustrates a wireless power transfer system including a power transmitting apparatus according to a first embodiment.

The power transmitting apparatus includes a first resonator 101, a power supply 102, a first control unit 103, a first communicating unit 104, and a mutual coupling adjustment mechanism (mutual coupling adjusting unit) 105. A control apparatus including the first control unit 103, the first communicating unit 104, and the mutual coupling adjustment mechanism 105 may be disposed outside the power transmitting apparatus, as an independent apparatus.

The first resonator 101 includes a first inductor (power transmitting inductor) 12, and has a predetermined resonant frequency. A power receiving apparatus includes a second resonator 201 including a second inductor 22. The second resonator 201 has the same predetermined resonant frequency as the first resonator 101. By mutual coupling between the first inductor 12 and the second inductor (power receiving inductor) 22, power is wirelessly transferred from the power transmitting apparatus. The first inductor 12 and the second inductor 22 each are, for example, a coil or one formed by winding a coil around an insertion member (core).

The first communicating unit 104 receives information on a voltage, a current, etc., on the power receiving apparatus side, by communicating with a second communicating unit 205 of the power receiving apparatus. In addition, the first communicating unit 104 receives information indicating the amount of required power on the power receiving side, for example, wirelessly or by wire.

The first control unit 103 monitors a power transmission voltage, a power transmission current, etc., of the power supply 102, and determines a coupling coefficient between the first inductor 12 and the second inductor 22 from the information on a voltage and a current on the power receiving side which is passed from the first communicating unit 104, and controls the mutual coupling adjustment mechanism 105 such that the coupling coefficient falls within a desired range indicated by design parameters. In addition, the first control unit 103 controls an AC voltage from the power supply 102, according to the amount of power desired by the power receiving apparatus.

The power supply 102 supplies AC power to the first resonator 101. Note that the first resonator 101 may receive AC power from the power supply 102 via a wiring line, or may receive AC power wirelessly from a loop element which is directly or indirectly connected to the power supply 102.

The power receiving apparatus includes the above-described second resonator 201, an adjustment circuit 202, a second control unit 203, a load 204, and the second communicating unit 205. The adjustment circuit 202 includes a rectifier or a DC-DC converter or both of them.

Power from the power transmitting apparatus is received by the second resonator 201 included in the receiving apparatus. The supplied power is rectified by the adjustment circuit 202 and the rectified power is further changed a voltage conversion ratio of the DC-DC converter, by which the power is converted to a desired voltage and current. Then, the voltage and the current are supplied to the load 204.

The second resonator 201 may supply AC power to the adjustment circuit (the rectifier and/or the DC-DC converter) 202 and the load 204 via wiring lines, or may wirelessly supply AC power to a loop element which is directly or indirectly connected to the adjustment circuit 202 and the load 204. Specifically, loop elements may be connected to the second resonator 201 and the adjustment circuit 202, respectively, so as to face each other and AC power may be transferred through the loop elements.

In the rectifier and the DC-DC converter included in the adjustment circuit 202, the rectifier may convert an AC signal transmitted from the second resonator 201 to a direct current and then the DC-DC converter may change the voltage conversion ration.

The load 204 is connected to an output terminal of the rectifier or the DC-DC converter, and receives direct-current power. The load 204 is a load circuit, a battery, or the like. The load 204 immediately consumes the supplied direct-current power or temporarily stores the supplied direct-current power (charging).

The first resonator 101 of the power transmitting apparatus includes a first capacitor 11 in addition to the above-described first inductor 12. As described above, the first resonator 101 has a predetermined resonant frequency $(=\omega_0)$. The inductance of the first inductor 12 is equal to $L_1$, and the capacitance of the first capacitor 11 is equal to $C_1$. The resonant frequency $(=\omega_0)$ is determined by the inductance $(=L_1)$ and capacitance $(=C_1)$ of the first resonator 101.

Note that in general the capacitance of a resonator can be compensated for by the parasitic capacitance of the resonator. In such a case, a capacitor which is a circuit component can be omitted from the components of the resonator. For example, when the resonator includes an inductor equivalent to a self-resonant coil, a capacitor which is a circuit component may not be necessary.

In addition, the capacitor 11 may be connected in series with or parallel to the inductor 12, or a plurality of capacitors may be connected in series and in parallel to the inductor 12.

The second resonator 201 includes a second capacitor 21 in addition to the above-described second inductor 22, and has the predetermined resonant frequency $(=\omega_0)$. The inductance of the second inductor 22 is equal to $L_2$, and the capacitance of the second capacitor 21 is equal to $C_2$. The resonant frequency $(=\omega_0)$ is determined by the inductance $(=L_2)$ and capacitance $(=C_2)$ of the second resonator 201. Namely, $C_2 L_2 = C_1 L_1$.

The capacitor 21 may be connected in series with or in parallel to the inductor 22, or a plurality of capacitors may be connected in series and in parallel to the inductor 22.

The second inductor 22 receives AC power from the first inductor 12 through mutual coupling $(=k)$.

The mutual coupling adjustment mechanism 105 has a mechanism capable of adjusting the mutual coupling between the inductors 12 and 22. Details of the mutual coupling adjustment mechanism 105 will be described later.

The technical significance of the mutual coupling adjustment mechanism 105 will be described below.

Figure 2:
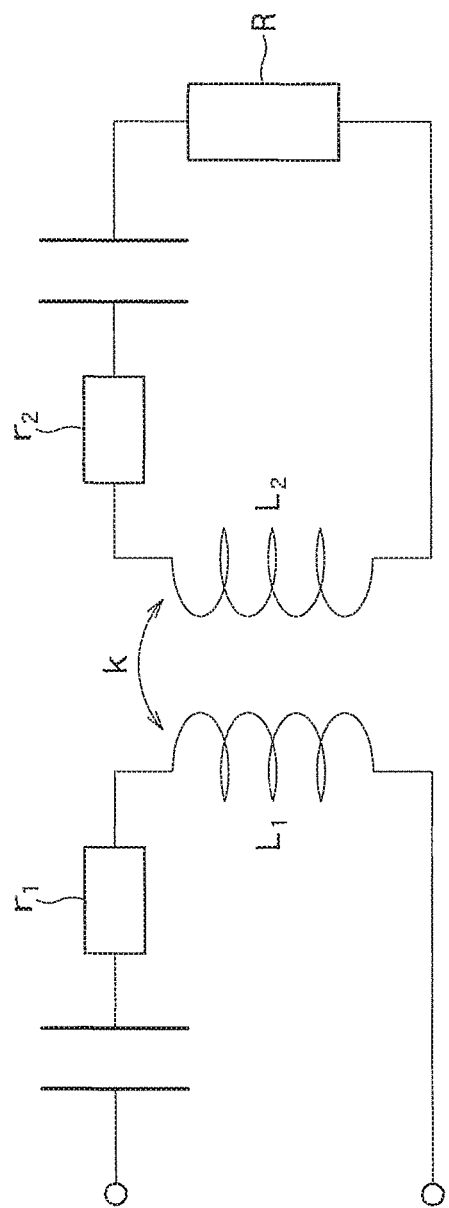
FIG. 2 is a diagram illustrating an equivalent circuit of the wireless power transfer system of FIG. 1.

FIG. 2 illustrates an equivalent circuit of a portion where power is transferred between the inductors in the wireless power transfer system of FIG. 1. In the drawing, $r_1$ and $r_2$ represent resistance components.

Figure 3:
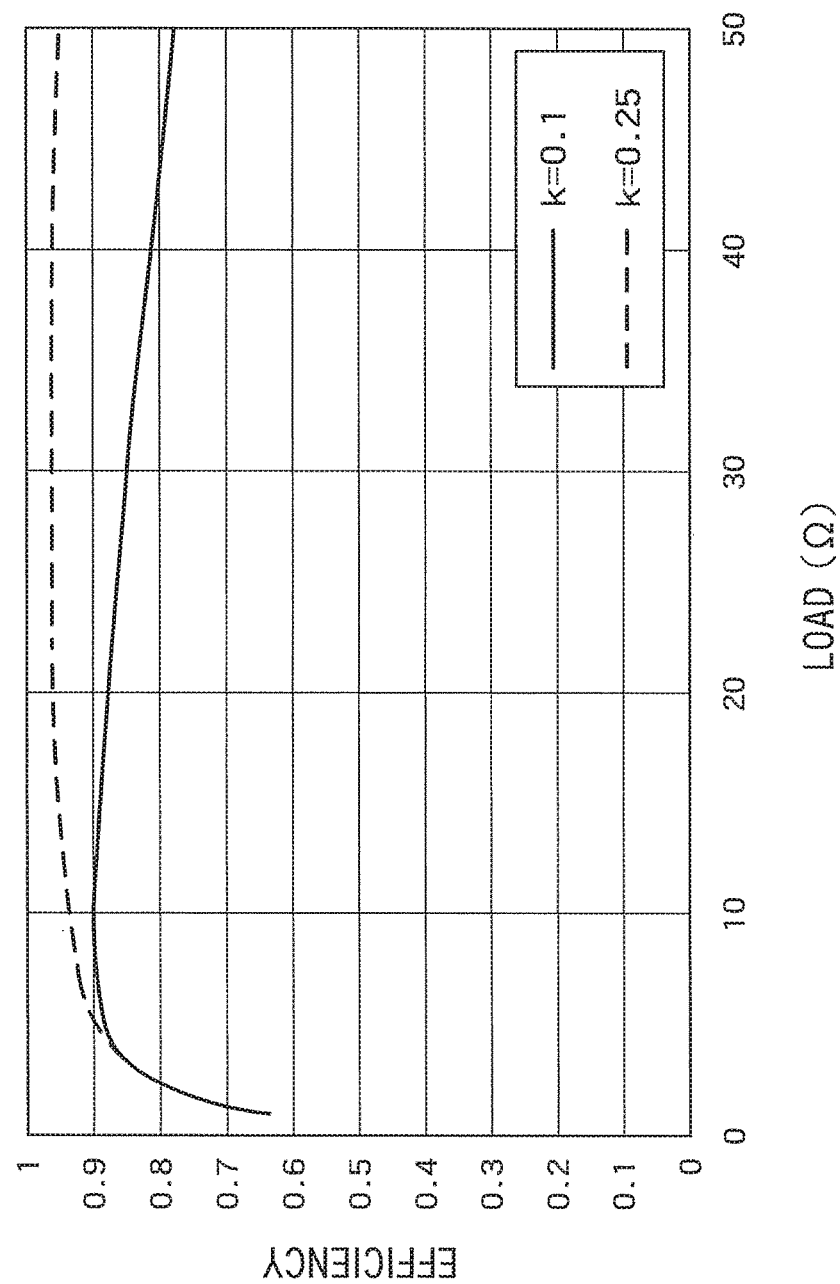
FIG. 3 is a diagram illustrating the efficiency of power consumed by a load in the equivalent circuit of FIG. 2.

FIG. 3 illustrates coil-to-coil efficiency characteristics with respect to a load R ($\Omega$) serving as the load 204, for the case of the coupling coefficient k being 0.1 and 0.25.

Figure 4:
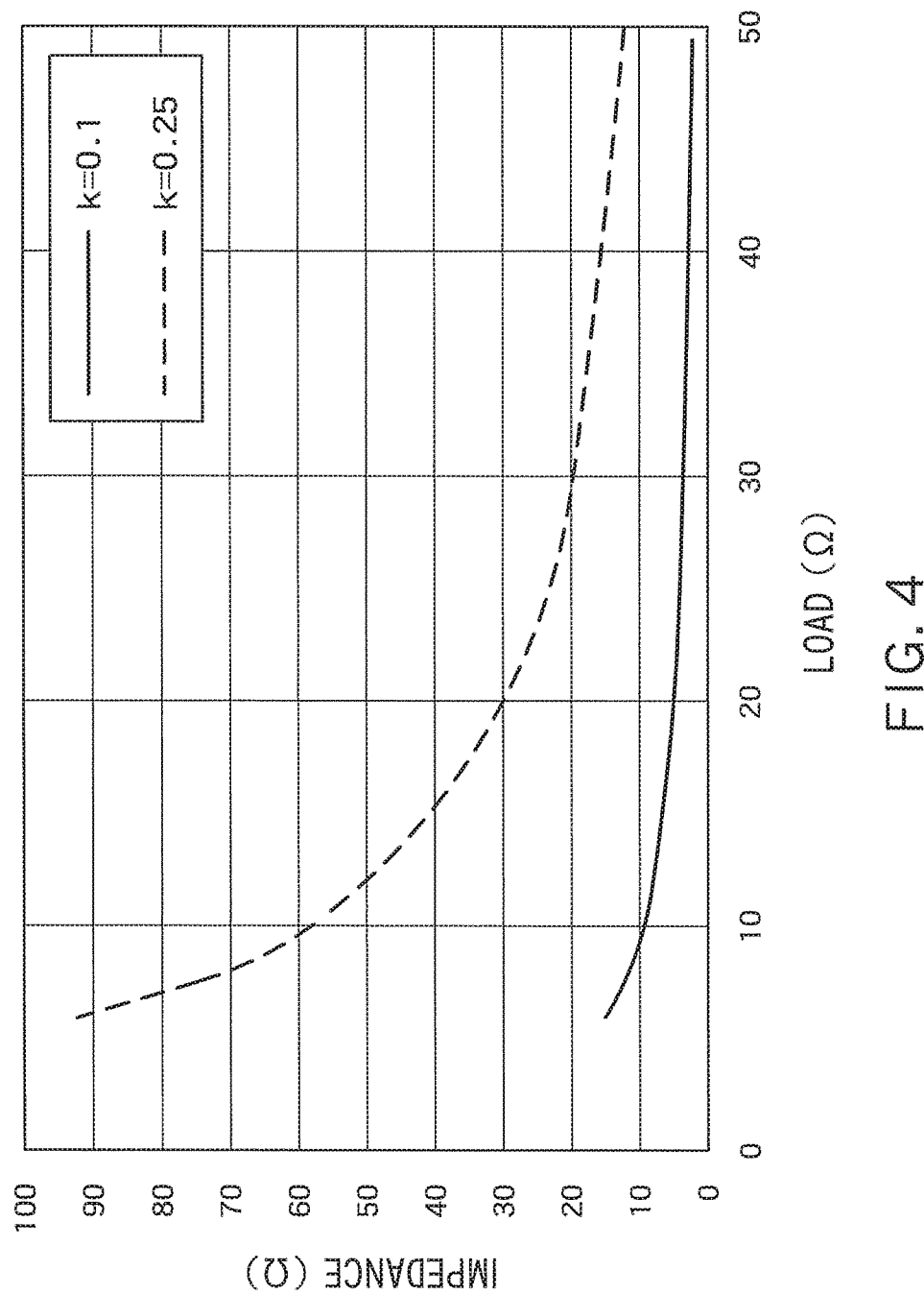
FIG. 4 is a diagram illustrating impedance when the load side is viewed from the power supply side in the equivalent circuit of FIG. 2.

FIG. 4 illustrates impedance presented to the AC power supply 102, for the case of the coupling coefficient k being 0.1 and 0.25.

The load resistance at which maximum inductor-to-inductor transfer efficiency is obtained differs depending on the coupling coefficient k. The coupling coefficient is determined by the positional relationship between the power transmitting apparatus and the power receiving apparatus. Now, the case is considered in which in a system controlled to have a load resistance of 10$\Omega$ so that optimum efficiency is obtained in a positional relationship between the power transmitting apparatus and the power receiving apparatus where the coupling coefficient between the first inductor 12 and the second inductor 22 is k=0.1, the power transmitting apparatus and the power receiving apparatus come close to each other, increasing the coupling coefficient (e.g., k=0.25).

From FIG. 3, the inductor-to-inductor efficiency is maintained; on the other hand, it looks as if the impedance presented to the AC power supply changes from 10$\Omega$ to 60$\Omega$. Therefore, when the voltage of the AC power supply is fixed, although the power transmission efficiency is maintained, the transmission power decreases. To overcome this, there is a need to perform control such as increasing the voltage of the AC power supply, or controlling by the adjustment circuit to reduce the impedance presented to the power supply.

Hence, by adjusting the coupling coefficient such that the coupling coefficient falls within the design parameter range, the control range of a voltage conversion ratio on the receiving side or the control range of transmitted voltage can be reduced.

The mutual coupling adjustment mechanism 105 will be described in more detail below.

The mutual coupling adjustment mechanism 105 adjusts mutual coupling through an adjustment to the relative positional relationship between the first inductor 12 and the second inductor 22. More specifically, the mutual coupling adjustment mechanism 105 adjusts mutual coupling through an adjustment to the position, tilt (inclination), etc., of one or both of the first inductor 12 and the second inductor 22. The mutual coupling adjustment mechanism 105 performs such operation under control of the first control unit 103.

Alternatively, the mutual coupling adjustment mechanism 105 may adjust mutual coupling through an adjustment to the position, tilt, etc., of an insertion member (not illustrated) disposed in a space between the first inductor 12 and the second inductor 22. Furthermore, a plurality of types of insertion members may be selectably prepared, and mutual inductance may be adjusted through the selection of the insertion members. Here, the insertion members are to change the magnetic flux between the inductors. The insertion members may be formed of, for example, metals, dielectrics, or magnetic materials or a combination thereof. The first or second inductor may be one formed by winding a coil around an insertion member, and the position of the insertion member in this case may be adjusted.

As described above, in the wireless power transfer system according to the first embodiment, even if there is a change in the positional relationship between the power transmitting apparatus and the power receiving apparatus, etc., by adjusting the positional relationship between the inductors such that the coupling coefficient falls within a desired range, transmission power and power transmission efficiency can be maintained while reducing the control range of a voltage conversion ratio on the receiving side or the control range of transmitted voltage.

Second Embodiment

Figure 5:
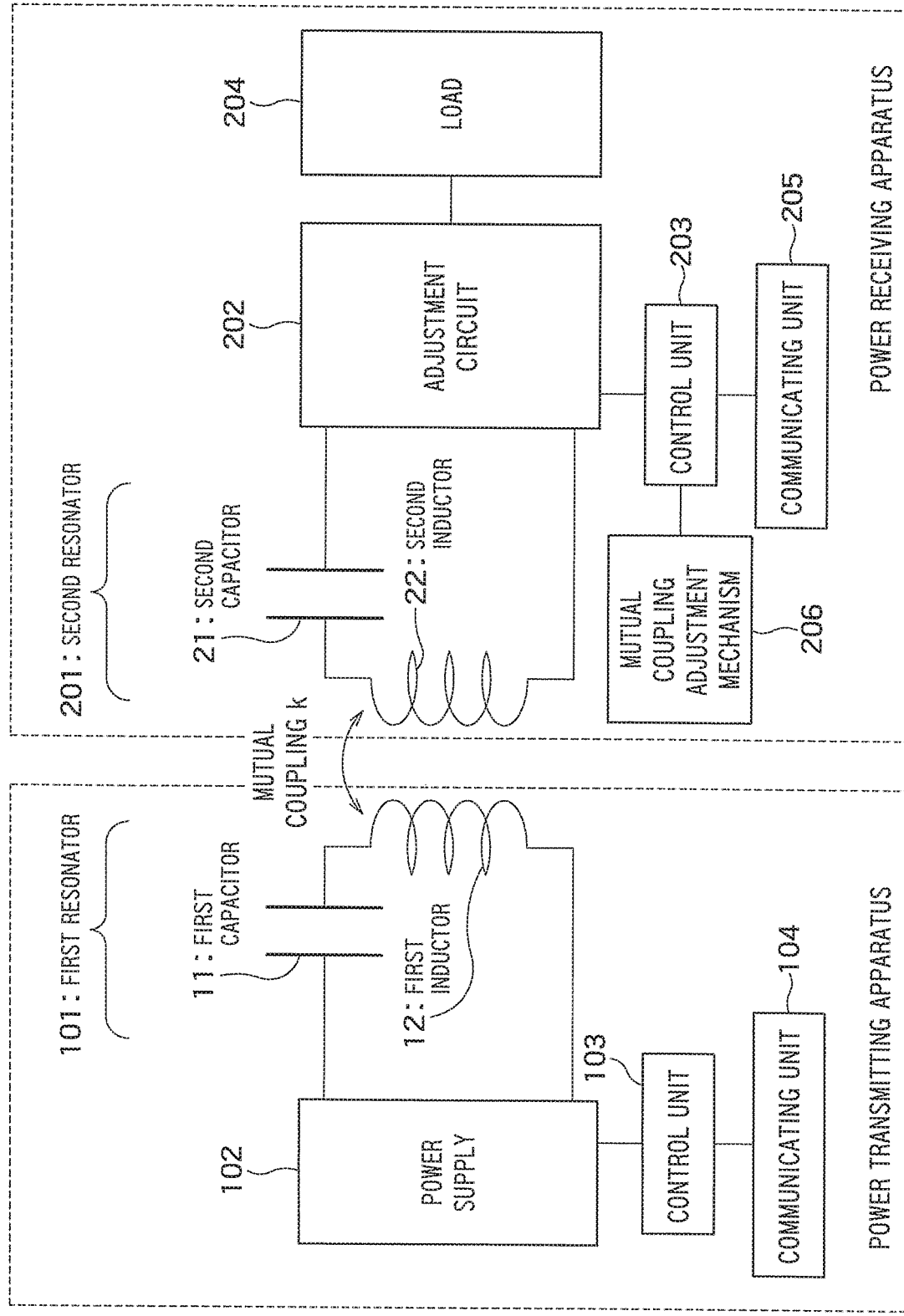
FIG. 5 is a diagram illustrating a wireless power transfer system according to a second embodiment.

FIG. 5 is a diagram illustrating a system including a mutual coupling adjustment mechanism on the power receiving apparatus side instead of in a power transmitting apparatus. The same components as those in FIG. 1 are denoted by the same reference numerals and overlapping description will not be made.

A power receiving apparatus includes a second resonator 201, an adjustment circuit 202, a second control unit 203, a load 204, a second communicating unit 205, and a mutual coupling adjustment mechanism (mutual coupling adjusting unit) 206. A control apparatus including the second control unit 203, the second communicating unit 205, and the mutual coupling adjustment mechanism 206 may be disposed outside the power receiving apparatus, as an independent apparatus. The load 204 may be disposed outside the power receiving apparatus.

The second communicating unit 205 transmits information on required power to the power transmitting apparatus side, and receives information on a voltage, a current, etc., on the power transmitting side from a first communicating unit 104 of a power transmitting apparatus. The second control unit 203 estimates mutual coupling from the voltage and current on the power transmitting side and the voltage and current on the power receiving side, and controls the mutual coupling adjustment mechanism 206 such that the coupling coefficient falls within a design parameter range. As in the first embodiment, the adjustment circuit 202 performs rectification and voltage-increasing/reducing in order to feed a desired voltage and current to the load 204.

Third Embodiment

Figure 6:
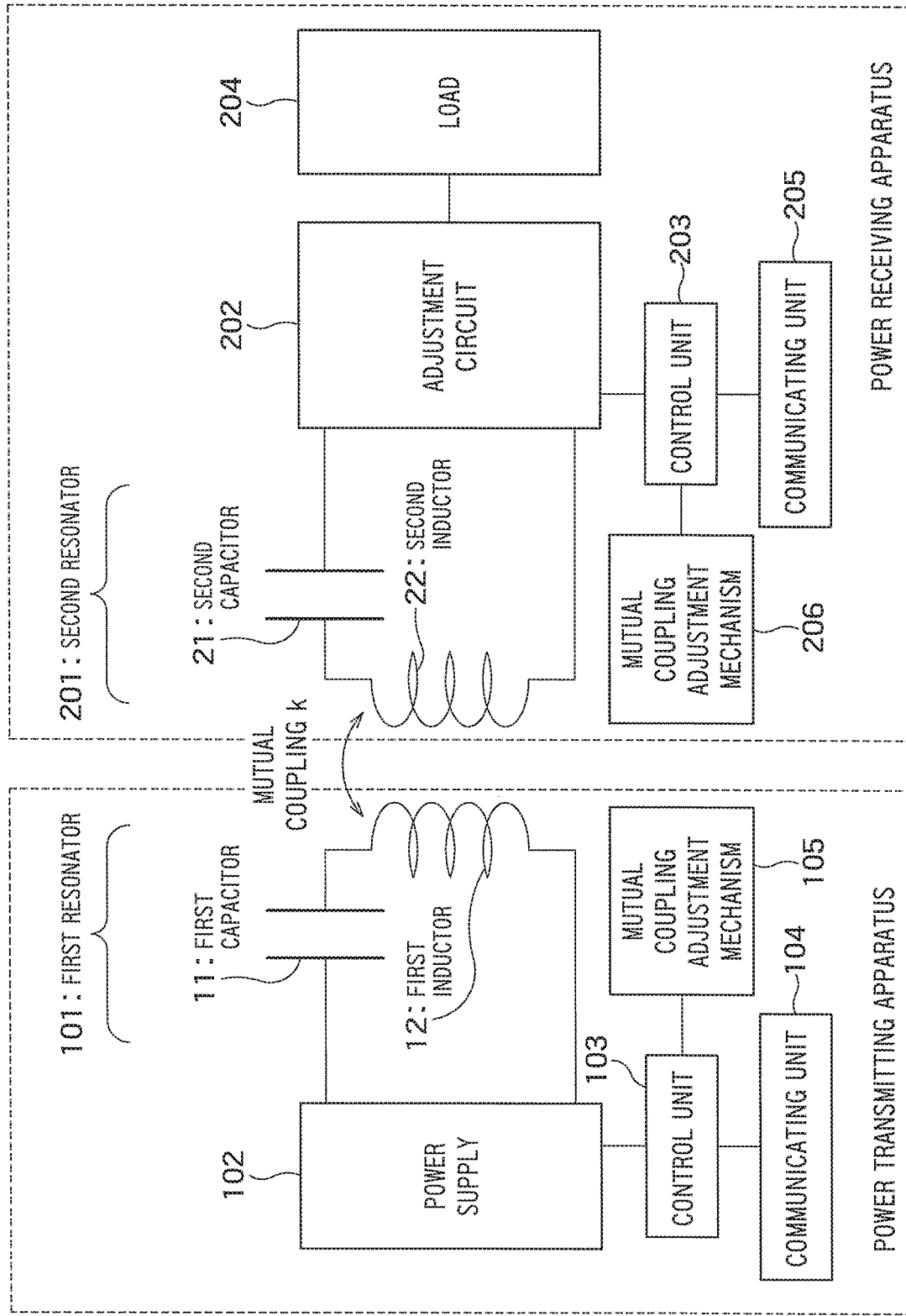
FIG. 6 is a diagram illustrating a wireless power transfer system according to a third embodiment.

FIG. 6 illustrates a system including mutual coupling adjustment mechanisms 105 and 206 in both of a power transmitting apparatus and a power receiving apparatus. First and second control units 103 and 203 of the power transmitting apparatus and the power receiving apparatus control the mutual coupling adjustment mechanisms 105 and 206 such that the coupling coefficient falls within a design parameter range. Control apparatuses including the first and second control units 103 and 203 and the mutual coupling adjustment mechanisms 105 and 206 may be disposed outside the power transmitting apparatus and the power receiving apparatus, as independent apparatuses.

Figure 7:
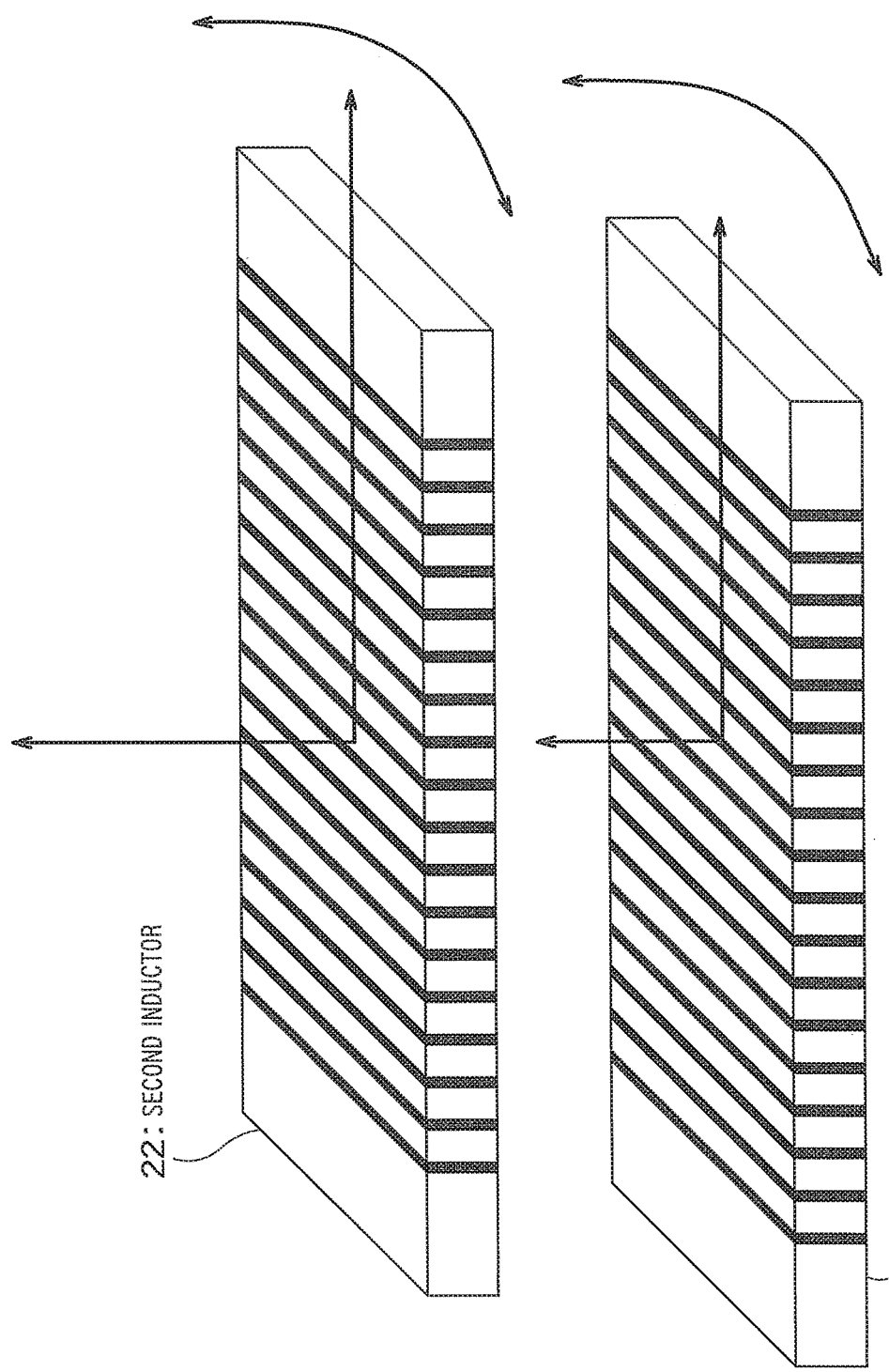
FIG. 7 is a diagram illustrating an example of a method of adjusting mutual coupling.

FIG. 7 illustrates an example of a method of adjusting mutual coupling according to the present embodiment.

A first inductor 12 and a second inductor 22 are disposed so as to face each other in a coil length direction (longitudinal direction). Each inductor is rotatable in directions indicated by arrows in the drawing.

When the coil length direction of the first inductor 12 is parallel to the coil length direction of the second inductor 22, the coupling coefficient increases. When the coil length direction of the first inductor 12 and the coil length direction of the second inductor 22 are in a right-angle positional relationship, the coupling coefficient decreases.

The mutual coupling adjustment mechanism 105 has a mechanism for rotating both or at least one of the coil length direction of the first inductor 12 and the coil length direction of the second inductor 22. By allowing the direction(s) to rotate, the coupling coefficient between the first inductor 12 and the second inductor 22 is adjusted.

Likewise, the mutual coupling adjustment mechanism 206 has a mechanism for rotating both or at least one of the coil length direction of the second inductor 22 and the coil length direction of the first inductor 12. By allowing the direction(s) to rotate, the coupling coefficient between the first inductor 12 and the second inductor 22 is adjusted.

The mutual coupling adjustment mechanisms of the first and second embodiments illustrated in FIGS. 1 and 5 likewise have a mechanism for rotating both or at least one of the coil length direction of the first inductor 12 and the coil length direction of the second inductor 22. By allowing the direction(s) to rotate, the coupling coefficient between the first inductor 12 and the second inductor 22 is adjusted.

Fourth Embodiment

Figure 21:
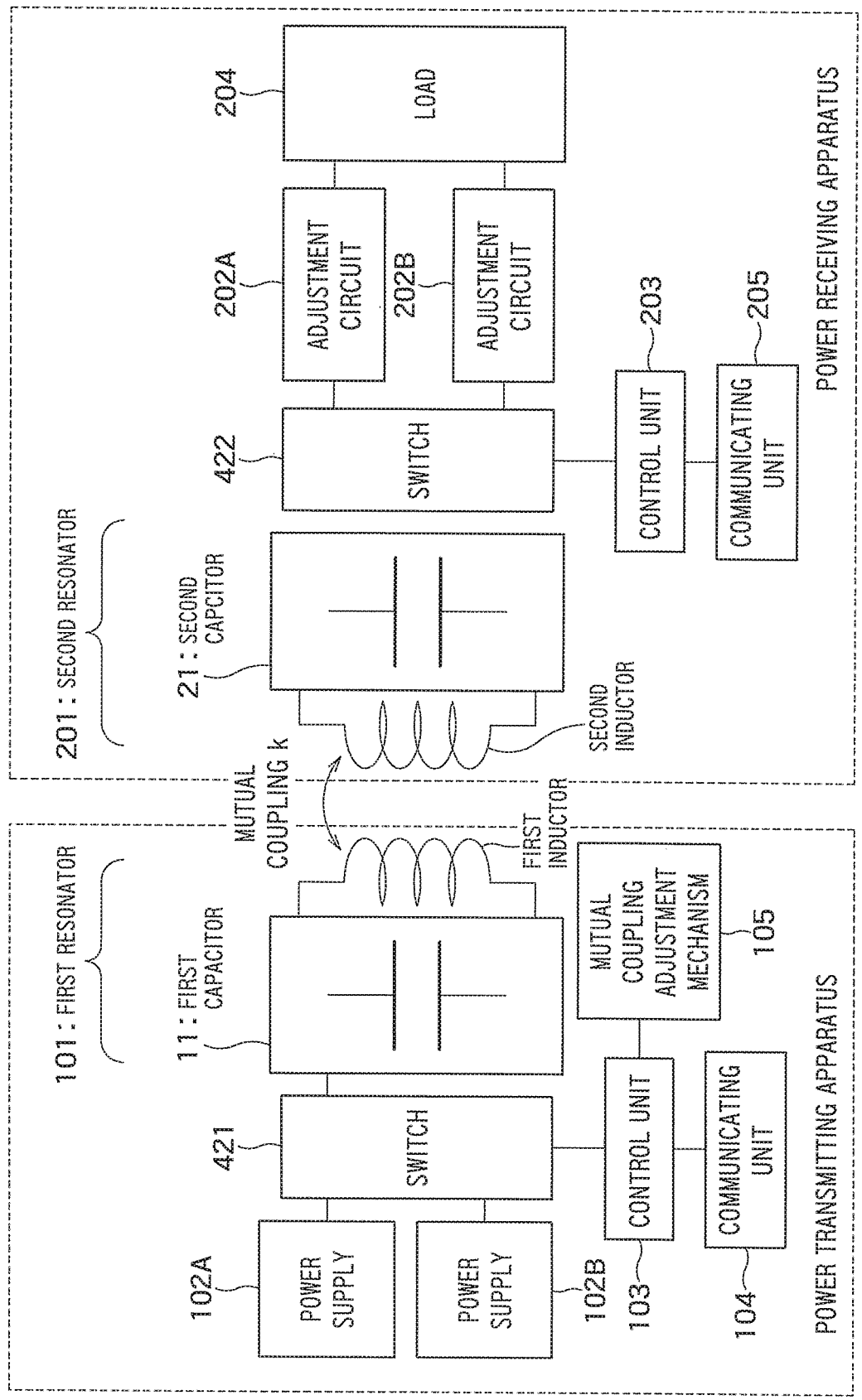
FIG. 21 is a diagram illustrating a wireless power transfer system including a power transmitting apparatus and a power receiving apparatus according to a fourth embodiment.

FIG. 21 illustrates a wireless power transfer system including a power transmitting apparatus and a power receiving apparatus according to a fourth embodiment. The same components as those in FIG. 1 are denoted by the same reference numerals and overlapping description will not be made. The present embodiment is characterized in that control methods (the magnitude of power supply voltage and the voltage conversion ratio) are changed depending on the magnitude of the coupling coefficient.

The power transmitting apparatus includes a first to an Nth power supply (N is an integer greater than or equal to 2). Here, N=2 and thus the power transmitting apparatus includes a power supply 102A and a power supply 102B. The power supply 102A has a higher power supply voltage than the power supply 102B.

In addition, the power transmitting apparatus includes a power supply switching unit 421 that switches a power supply to be connected to a first resonator 101, between the power supplies 102A and 102B. In a high region where the coupling coefficient is higher than or equal to a predetermined value, a first control unit 103 controls the switching unit 421 to switch to the power supply 102A with a high power supply voltage. In a low region where the coupling coefficient is less than the predetermined value, the first control unit 103 controls the power supply switching unit 421 to switch to the power supply 102B with a low power supply voltage. More generally, assuming that the power supply voltage is higher in order of the first to the Nth, the switching unit 421 switches to a power supply with a smaller number among the first to the Nth, for a higher mutual coupling coefficient.

The power receiving apparatus includes a first to an Mth adjustment circuit. Here, M=2 and thus the power receiving apparatus includes an adjustment circuit 202A and an adjustment circuit 202B. The adjustment circuit 202A reduces an output voltage from a second resonator 201, and the adjustment circuit 202B increases the output voltage.

In addition, the power receiving apparatus includes an adjustment circuit switching unit 422 that switches an output destination of received power of the second resonator 201, between the adjustment circuits 202A and 202B. In a high region where the coupling coefficient is higher than or equal to a predetermined value, a second control unit 203 controls the adjustment circuit switching unit 422 to switch to the adjustment circuit 202A that performs voltage-increasing. In a low region where the coupling coefficient is less than the predetermined value, the second control unit 203 controls the adjustment circuit switching unit 422 to switch to the adjustment circuit 202B that performs voltage-increasing. More generally, assuming that the voltage conversion ratio is smaller in order of the first to the Mth adjustment circuit, the adjustment circuit switching unit 422 switches to an adjustment circuit with a smaller number among the first to the Mth, for a higher mutual coupling coefficient.

By thus changing control methods (the magnitude of power supply voltage and the voltage conversion ratio) depending on the magnitude of the coupling coefficient, transmission power and transfer efficiency can be ideally maintained.

Other Embodiments

Figure 8:
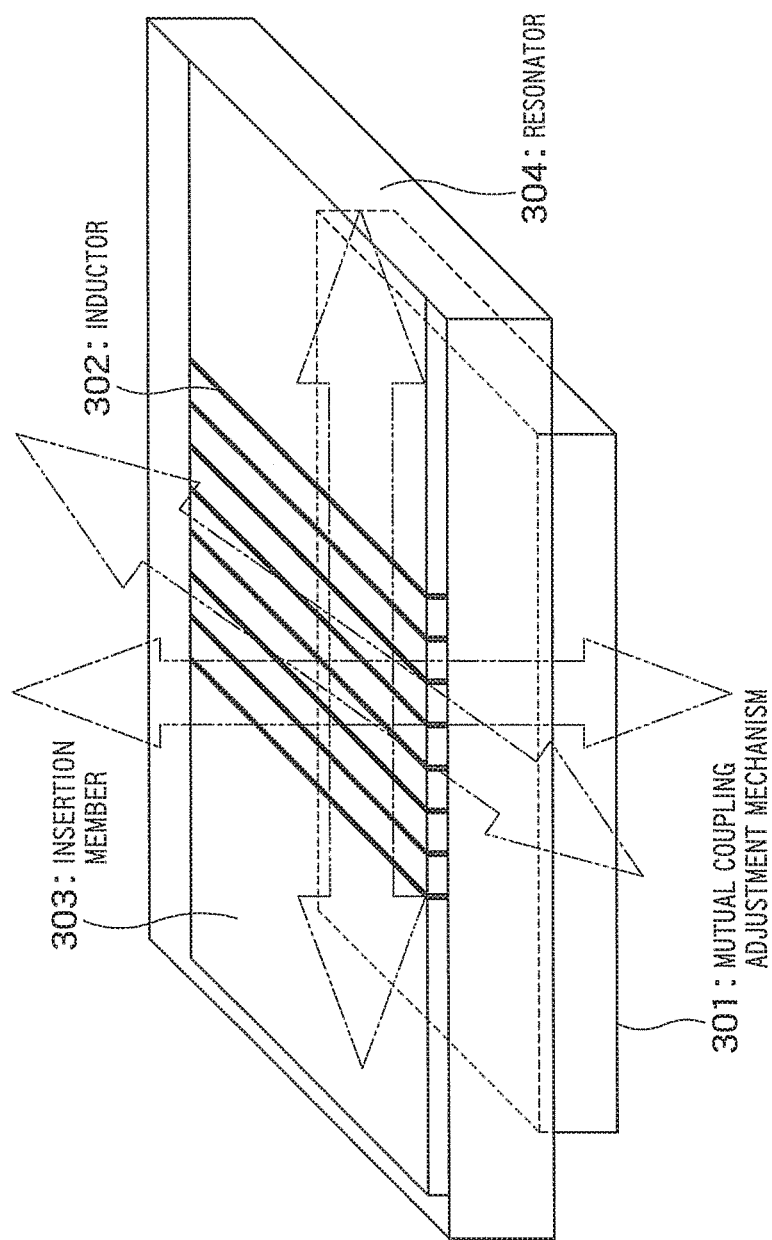
FIG. 8 is a diagram illustrating an exemplary configuration of a mutual coupling adjustment mechanism.

FIG. 8 schematically illustrates an exemplary configuration of a mutual coupling adjustment mechanism. A mutual coupling adjustment mechanism 301 allows a resonator 304 including an inductor 302 which is a coil wound around a core (insertion member) to move up and down, forward and backward, and left and right. The resonator 304 includes a casing having an opening, and stores the inductor 302 in the casing. Other members such as a control circuit, a communicating unit, and wiring are not illustrated (which is likewise applied to the following other description). The mutual coupling adjustment mechanism 301 allows the resonator 304 to externally move up and down, forward and backward, and left and right. For specific moving methods, any method may be used and known methods may be used. Note that the mutual coupling adjustment mechanism 301 and the resonator 304 may be provided on either side, a power transmitting apparatus or a power receiving apparatus.

Figure 9:
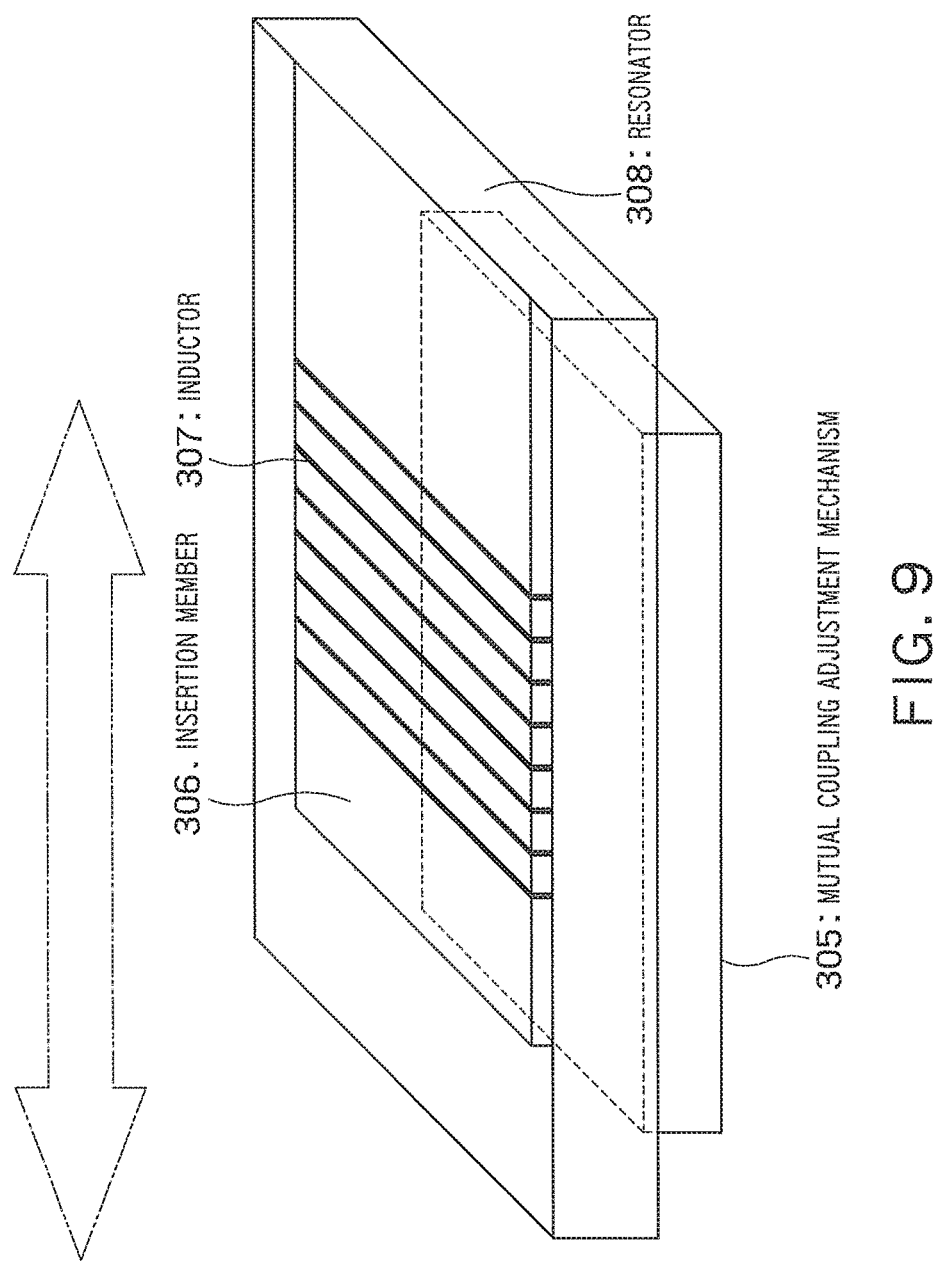
FIG. 9 is a diagram illustrating another exemplary configuration of a mutual coupling adjustment mechanism.

FIG. 9 illustrates another exemplary configuration of a mutual coupling adjustment mechanism. A mutual coupling adjustment mechanism 305 moves the position of a core (insertion member) inserted in a coil of an inductor 307 in directions of arrows illustrated in the drawing. A resonator 308 includes the inductor 307 and a casing having an opening and enclosing the inductor 307. The insertion member is allowed to move in the directions of the arrows, with the position of the coil being fixed. For specific moving mechanisms, any known moving mechanism may be used. For example, the insertion member may be allowed to move by physical contact such as roller rotation, or may be allowed to move by magnetic force. When the insertion member is disposed between two coils instead of in a hollow portion of the coil, it is also possible to change the tilt of the insertion member. Note that the mutual coupling adjustment mechanism 305 and the resonator 308 may be provided on either side, a power transmitting apparatus or a power receiving apparatus.

Figure 10:
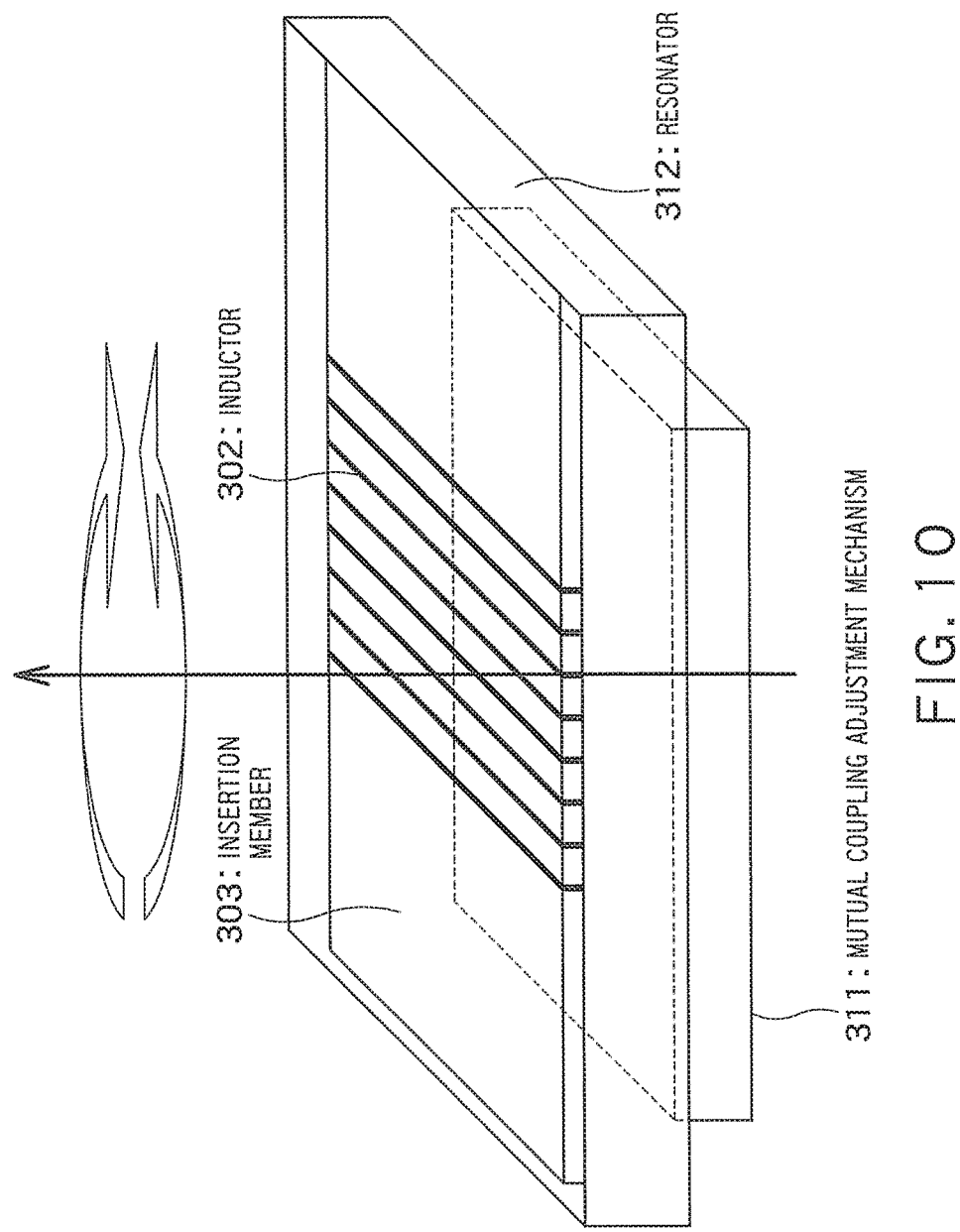
FIG. 10 is a diagram illustrating still another exemplary configuration of a mutual coupling adjustment mechanism.

FIG. 10 illustrates still another exemplary configuration of a mutual coupling adjustment mechanism. A mutual coupling adjustment mechanism 311 rotates a resonator 312 including an inductor formed by winding a coil around a core (insertion member) in directions of arrows illustrated in the drawing. The resonator 312 includes the inductor and a casing having an opening and enclosing the inductor. Note that the mutual coupling adjustment mechanism 311 and the resonator 312 may be provided on either side, a power transmitting apparatus or a power receiving apparatus.

Figure 11:
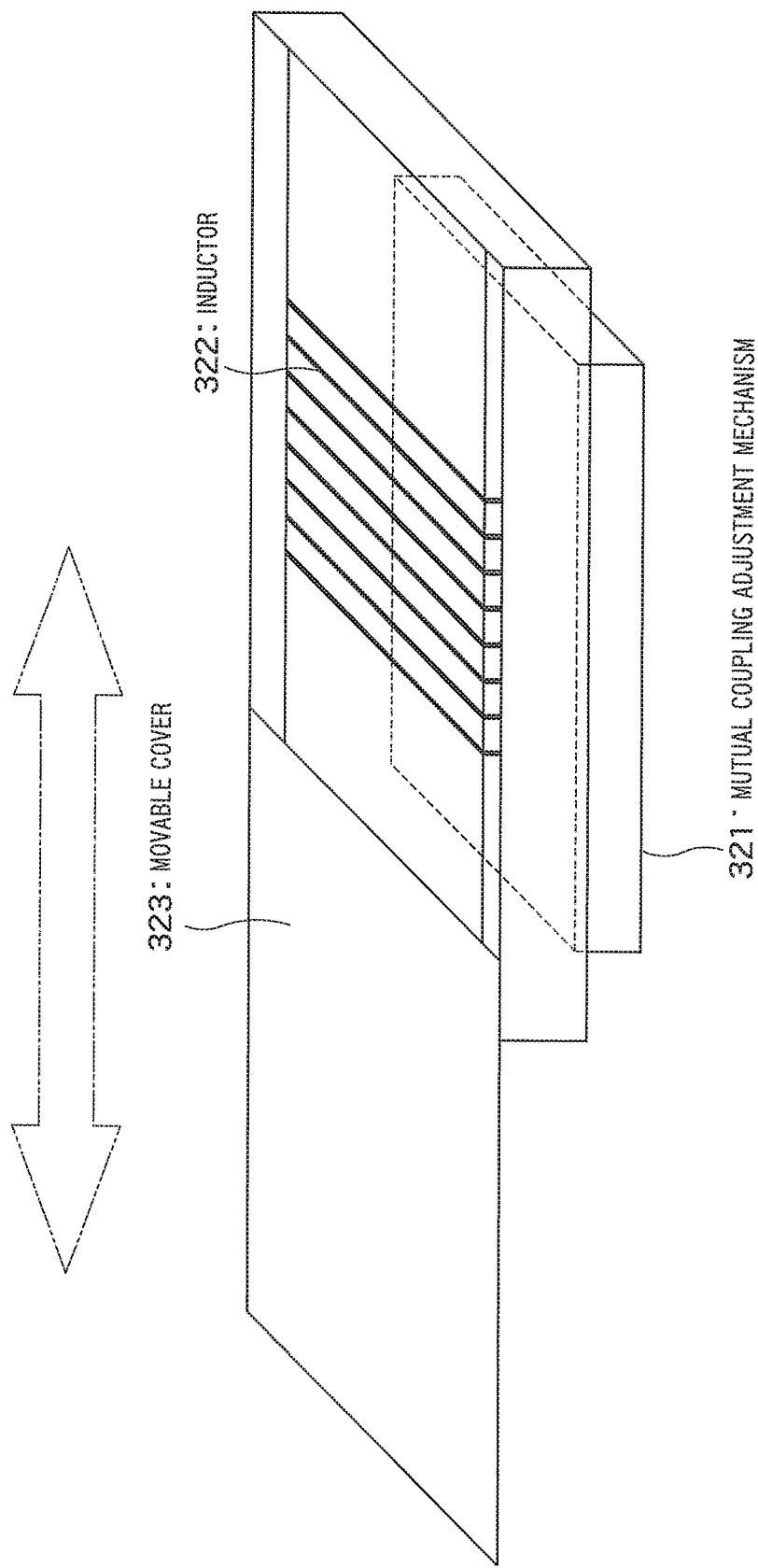
FIG. 11 is a diagram illustrating yet another exemplary configuration of a mutual coupling adjustment mechanism.

FIG. 11 illustrates yet another exemplary configuration of a mutual coupling adjustment mechanism. A resonator has an inductor 322 disposed in a casing having an opening. A movable cover (cover member) 323 is provided in the opening of the casing. A mutual coupling adjustment mechanism 321 adjusts the degree of opening and closing of the cover member 323. By this, the mutual coupling between two inductors for transmission and reception changes. Note that the mutual coupling adjustment mechanism 321 and the resonator may be provided on either side, a power transmitting apparatus or a power receiving apparatus.

Figure 12:
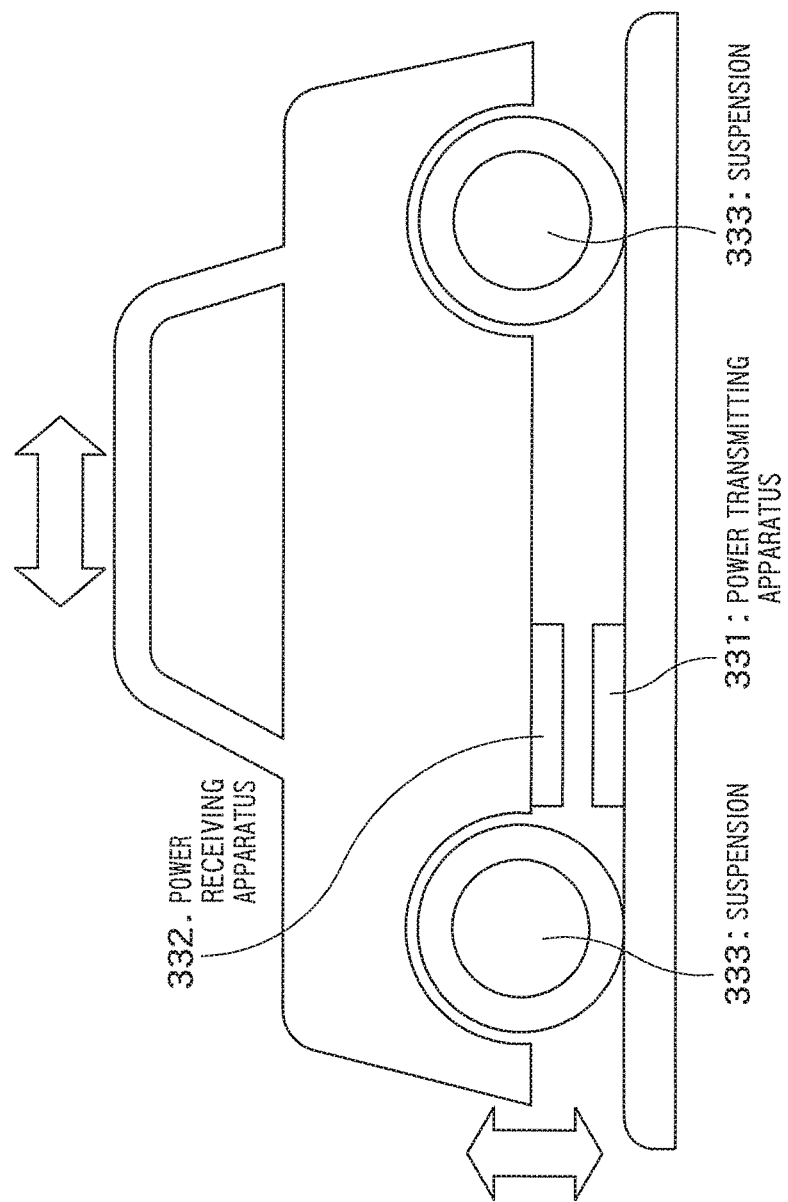
FIG. 12 is a diagram illustrating still another exemplary configuration of a mutual coupling adjustment mechanism.

FIG. 12 illustrates still another exemplary configuration of a mutual coupling adjustment mechanism. A power receiving apparatus 332 is disposed at the bottom of a car, and a power transmitting apparatus 331 is disposed in a parking facility (e.g., the ground). The mutual coupling adjustment mechanism moves up and down the whole car including the power receiving apparatus 332 by moving suspensions 333 of the car. By this, the up-to-down distance between the power transmitting apparatus 331 and the power receiving apparatus 332, i.e., the distance between two inductors, is adjusted (the mutual coupling is adjusted). Note that the power receiving apparatus may be provided in other areas such as the top, instead of at the bottom of the car. In that case, the power transmitting apparatus is also disposed in another location (e.g., the ceiling of the parking facility).

Alternatively, the mutual coupling adjustment mechanism may make a position adjustment between the power transmitting apparatus 331 and the power receiving apparatus 332, i.e., an adjustment of the mutual coupling, by moving the position of the car in forward and backward or left and right directions (automatic operation).

Alternatively, a control unit may identify positions of the suspensions 333 in which the mutual coupling coefficient falls within a predetermined range, and may control the mutual coupling adjustment mechanism such that the suspensions 333 are locked in the positions. The control unit and the mutual coupling adjustment mechanism may be provided in either of the power transmitting apparatus 331 and the power receiving apparatus 332, or may be provided in both of them. Alternatively, the control unit and the mutual coupling adjustment mechanism may be configured as a control apparatus independent of the power transmitting apparatus 331 and the power receiving apparatus 332.

Figure 13:
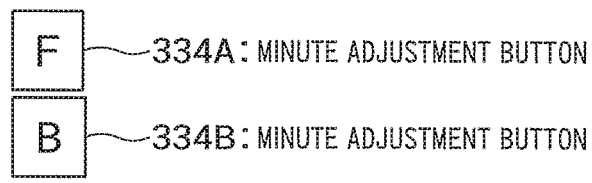
FIG. 13 is a diagram illustrating minute adjustment buttons that instruct movement of a car.

Here, the car may include buttons that instruct at least one of the power transmitting apparatus 331 and the power receiving apparatus 332 to move forward and backward or left and right or up and down. FIG. 13 illustrates a minute adjustment button 334A that instructs the power receiving apparatus to move forward (F) of the car, and a minute adjustment button 334B that instructs the power receiving apparatus to move backward (B). The position of the power receiving apparatus with respect to the power transmitting apparatus may be appropriately adjusted by a user minutely adjusting the position of the power receiving apparatus by pressing these buttons. Specific operation is such that the control unit controls the mutual coupling adjustment mechanism based on an input to the buttons, to adjust the position of the power receiving apparatus. In this case, the mutual coupling adjustment mechanism also includes a mechanism for moving the position of the power receiving apparatus.

Figure 14:
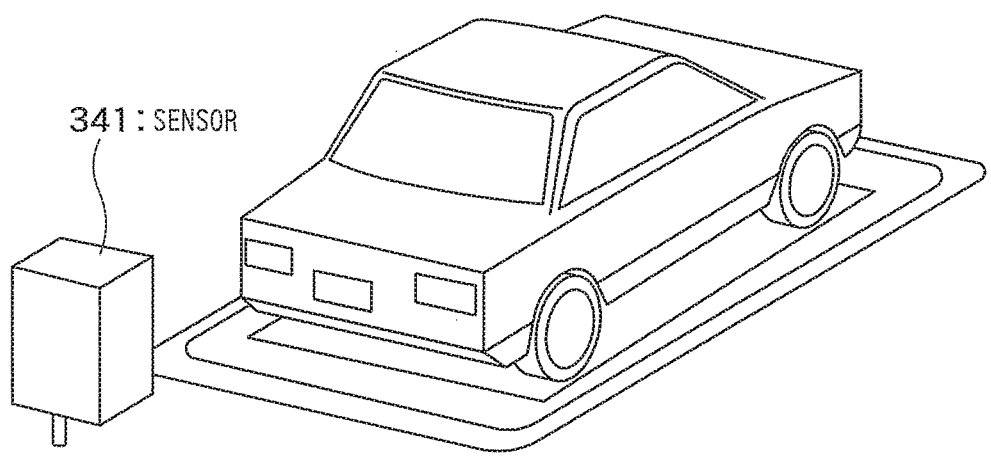
FIG. 14 is a diagram illustrating an example of detecting a position of a receiving apparatus, based on a sensor installed in a parking facility.

Alternatively, instead of an input to the buttons, as illustrated in FIG. 14, the control unit may detect a position of the receiving apparatus based on a detected value of a sensor 341 installed in the parking facility, and may control the mutual coupling adjustment mechanism to adjust the position of the power receiving apparatus with respect to the power transmitting apparatus (rough adjustment). For example, the sensor is a camera sensor. By analyzing an image captured by the camera sensor, the power receiving apparatus mounted, for example, at the bottom of the car (see FIG. 12) is detected. Alternatively, if a correspondence relationship between a predetermined area of the car (e.g., a tire, a license plate, a light, or a mark placed for position adjustment) and the position of the power receiving apparatus is known in advance, then a position of the power receiving apparatus may be identified by detecting the predetermined area. Thereafter, the mutual coupling may be minutely adjusted by, for example, moving a resonator included in the power receiving apparatus or the power transmitting apparatus.

Figure 15:
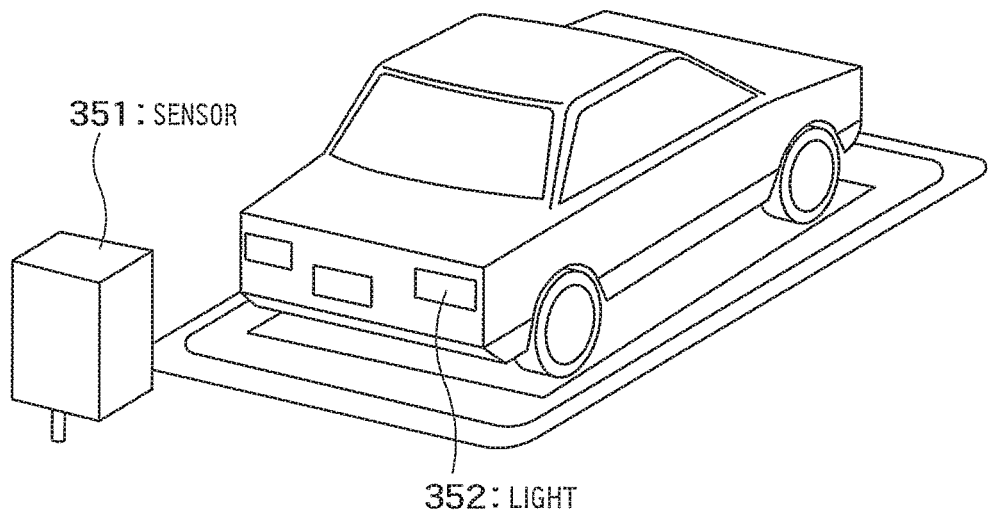
FIG. 15 is a diagram illustrating an example of identifying a position of the power receiving apparatus, based on light emission from a backlight of the car.

Alternatively, as illustrated in FIG. 15, a sensor 351 may detect light emission from a backlight 352 of the car, and a position of the power receiving apparatus may be identified from the light emission position of the backlight 352.

Figure 16:
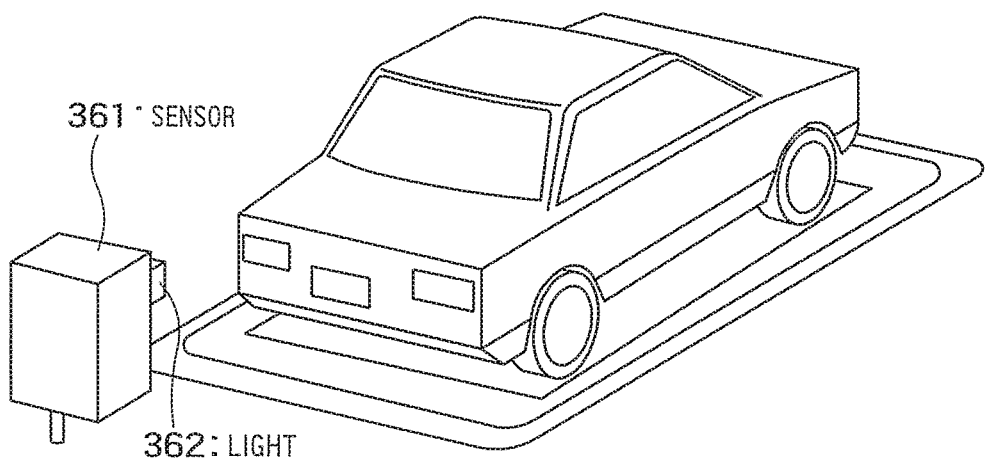
FIG. 16 is a diagram illustrating an example of emitting light by an installed light when the environment of a camera sensor is dark.

The case is considered in which, as illustrated in FIG. 16, an light (lighting unit) 362 is disposed near a sensor 361, and the sensor 361 includes a camera sensor and an illumination sensor (determining unit) that determines a brightness of the environment of the camera sensor. At this time, when the illumination sensor detects that the environment of the camera sensor is dark, the control unit may turn on the lighting unit 362 to perform imaging by the camera sensor. By this, even in a dark environment such as a nighttime, a position of the power receiving apparatus can be accurately detected.

Figure 17:
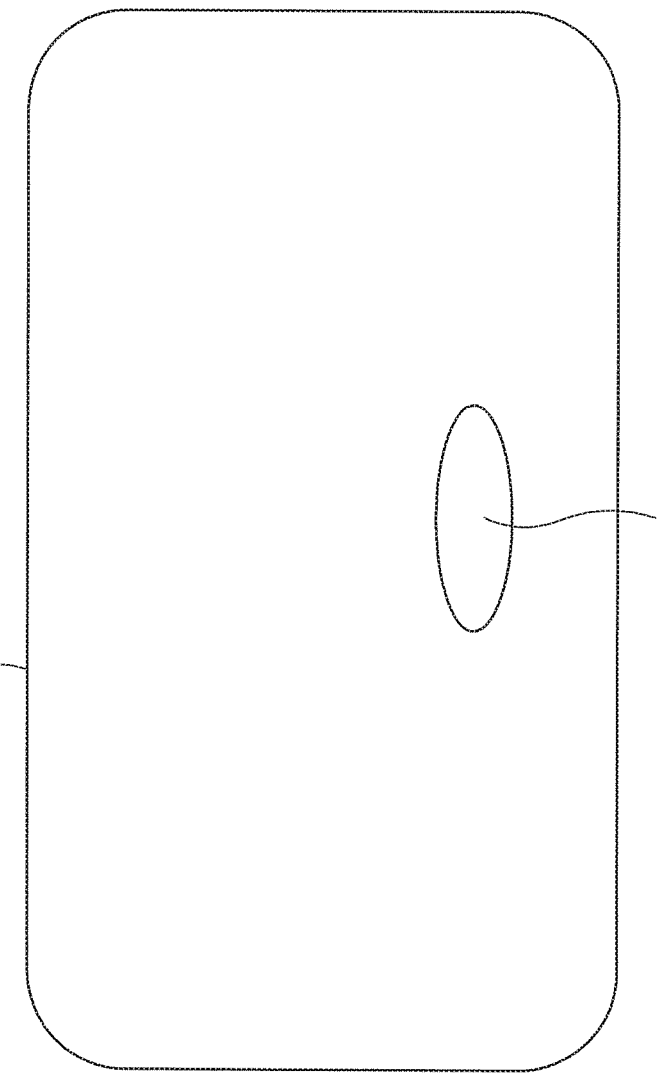
FIG. 17 is a diagram illustrating an example of displaying a position adjustment mark on a rear view monitor of the car.

Alternatively, as illustrated in FIG. 17, a rear view monitor that displays an image captured by a camera mounted at the rear of a car body may be included in the car, and the control unit may display a position adjustment mark on the rear view monitor. By this, a user can be urged to adjust the position of the power receiving apparatus mounted on the car, with respect to the power transmitting apparatus mounted on the ground. Thereafter, the mutual coupling may be further minutely adjusted by, for example, movement of the power receiving apparatus or the power transmitting apparatus or movement of the resonator.

Figure 18:
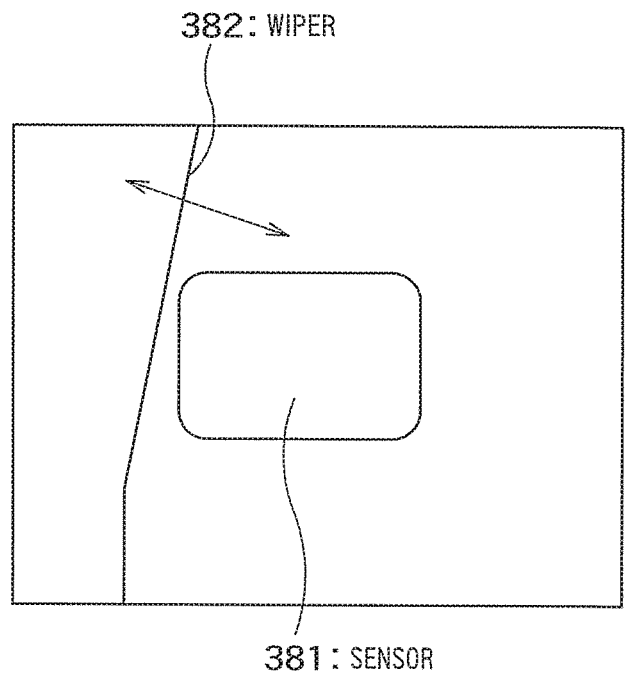
FIG. 18 is a diagram illustrating an example of removing dirt on a lens of a sensor by a wiper.

Alternatively, as illustrated in FIG. 18, a sensor 381 may be a camera sensor, and a wiper 382 may be mounted on the sensor 381. At this time, the control unit may analyze an image captured by the camera sensor to detect dirt on a lens of the camera sensor, and may control drive of the wiper 382 to remove the dirt on the lens. The lens of the sensor may be provided with anti-dirt treatment by Teflon coating, waterproof coating, or the like. When the control unit detects dirt on the lens of the camera sensor as a result of analyzing an image captured by the camera sensor 381, the control unit may notify a user about the dirt on the lens. For notification methods, sound may be emitted or such a fact may be displayed on a monitor or other methods may be used.

Figure 19:
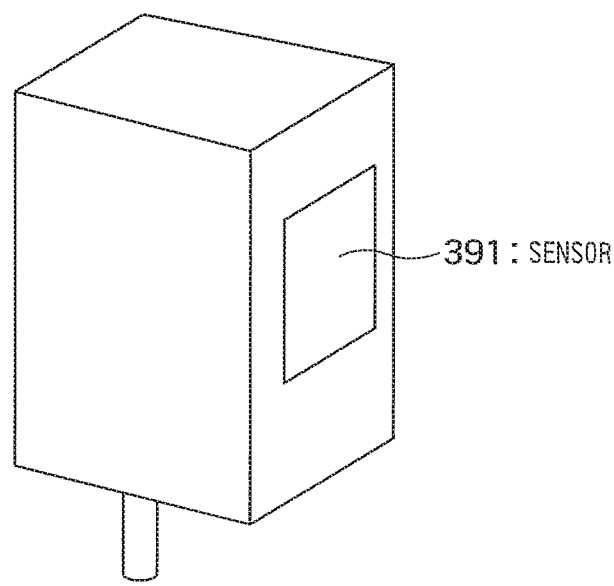
FIG. 19 is a diagram illustrating an example of a camera sensor disposed vertically.

Alternatively, as illustrated in FIG. 19, a camera sensor 391 may be disposed longitudinally such that a lens of the camera sensor 391 is perpendicular to the surface of the installation place of the camera. This enables to suppress dirt on the lens which is caused by accumulation of dust, etc. Note that the vertical disposition of the sensor indicates that the lens surface of the camera sensor is perpendicular to the ground. In contrast, horizontal disposition indicates that the lens surface of the camera sensor is parallel to the ground.

FIG. 20 illustrates still another exemplary configuration of a mutual coupling adjustment mechanism.

The mutual coupling adjustment mechanism includes a weight sensor 402 that detects, by a change in weight, that foreign matter is contacted with a resonator 404. A movable member 403 movable in a longitudinal or lateral direction of an inductance is disposed in an opening of a casing of the resonator 404. When foreign matter is detected by the weight sensor 402, the control unit allows the mutual coupling adjustment mechanism to move the movable member 403 to remove the foreign matter.

Alternatively, the mutual coupling adjustment mechanism may include a temperature sensor 401 that detects, by a change in temperature, that foreign matter is contacted with a resonator 404. A movable member 403 movable in a longitudinal or lateral direction of an inductance is disposed in an opening of a casing of the resonator 404. When foreign matter is detected by the temperature sensor 401, the control unit allows the mutual coupling adjustment mechanism to move the movable member 403 to remove the foreign matter.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power transmitting apparatus for transmitting power to a power receiving apparatus, the power transmitting apparatus comprising:
   a power supply configured to generate AC power;
   a power transmitting inductor coupled to the power supply and configured to transmit the AC power generated by the power supply to the power receiving apparatus through magnetic coupling with a power receiving inductor to be coupled to a load in the power receiving apparatus;

a sensor configured to detect, based on a change in temperature or in weight, foreign matter contacting with one of the power transmitting inductor and the power receiving inductor;

a movable member movable in a longitudinal or a lateral direction of the one of the power transmitting inductor and the power receiving inductor;

a mechanism coupled with the movable member and at least one of the power transmitting inductor and the power receiving inductor and configured to change at least one of an angle and a position between the power transmitting inductor and the power receiving inductor; and control circuitry configured to control the mechanism based on a mutual coupling coefficient between the power transmitting inductor and the power receiving inductor to change an angle or a position of at least one of the power transmitting inductor and the power receiving inductor to thereby change the angle or the position between the power transmitting inductor and the power receiving inductor, and configured to set the mutual coupling coefficient within a range, wherein an upper limit of the range is a value less than a maximum of the mutual coupling coefficient between the power transmitting inductor and the power receiving inductor, and wherein when the foreign matter is detected by the sensor, the control circuitry is configured to control the mechanism to move the movable member to remove the foreign matter.

2. The power transmitting apparatus according to claim 1, further comprising communicating circuitry configured to communicate with the power receiving apparatus to obtain information on a received voltage and a received current in the power receiving apparatus, wherein the control circuitry computes the mutual coupling coefficient, based on the received voltage and the received current in the power receiving apparatus and a transmitted voltage and a transmitted current in the power transmitting apparatus.

3. The power transmitting apparatus according to claim 1, wherein the power transmitting inductor is coupled to the power supply by wiring.

4. The power transmitting apparatus according to claim 1, wherein the control circuitry monitors whether the mutual coupling coefficient is set within the range, and if the mutual coupling coefficient is not set within the range, the control circuitry adjusts the angle or the position of at least one of the power transmitting inductor and the power receiving inductor via the mechanism to set the mutual coupling coefficient within the range.

5. The power transmitting apparatus according to claim 1, wherein the range includes at least three values of the mutual coupling coefficient, and the control circuitry controls the mechanism so that the mutual coupling coefficient is identical to one of the at least three values.

6. The power transmitting apparatus according to claim 1, wherein no other inductor is arranged between the power transmitting inductor and the power receiving inductor.

7. The power transmitting apparatus according to claim 1, wherein the mechanism is physically connected to the at least one of the power transmitting inductor and the power receiving inductor.

8. The power transmitting apparatus according to claim 7, wherein the mechanism mechanically moves the at least one of the power transmitting inductor and the power receiving inductor.

9. The power transmitting apparatus according to claim 1, wherein the mechanism rotates the at least one of the power transmitting inductor and the power receiving inductor to change the angle or the position between the power transmitting inductor and the power receiving inductor.

10. The power transmitting apparatus according to claim 9, wherein the mechanism mechanically tilts the at least one of the power transmitting inductor and the power receiving inductor.

11. The power transmitting apparatus according to claim 1, wherein:

an insertion member is disposed in a space between the power transmitting inductor and the power receiving inductor, the mechanism is configured to change one of a position and a tilt of the insertion member, and the control circuitry is further configured to control the mechanism based on the mutual coupling coefficient to change the one of the position and the tilt of the insertion member and thereby set the mutual coupling coefficient within the range.

12. The power transmitting apparatus according to claim 1, wherein:

the power supply comprises first to Nth power supplies, the power transmitting apparatus further comprises power supply switching circuitry configured to select one of the first to Nth power supplies, power supply voltages of the first to Nth power supplies increase in order from the first to the Nth power supply, where N is an integer greater than or equal to 2, and the power supply switching circuitry is configured to select a power supply with a smaller number among the first to Nth power supplies for a higher mutual coupling coefficient.

13. A power receiving apparatus for receiving power from a power transmitting apparatus, the power receiving apparatus comprising:

a power receiving inductor configured to receive AC power through magnetic coupling with a power transmitting inductor to be coupled to a power supply in the power transmitting apparatus;

an adjustment circuit coupled to the power receiving inductor and configured to supply the AC power received by the power receiving inductor to a load;

a sensor configured to detect, based on a change in temperature or in weight, foreign matter contacting with one of the power receiving inductor and the power transmitting inductor;

a movable member movable in a longitudinal or a lateral direction of the one of the power receiving inductor and the power transmitting inductor;

a mechanism coupled with the movable member and at least one of the power receiving inductor and the power transmitting inductor and configured to change at least one of an angle and a position between the power receiving inductor and the power transmitting inductor; and control circuitry configured to control the mechanism based on a mutual coupling coefficient between the power receiving inductor and the power transmitting inductor to change an angle or a position of at least one of the power receiving inductor and the power transmitting inductor to thereby change the angle or the position between the power receiving inductor and the power transmitting inductor, and configured to set the mutual coupling coefficient within a range, wherein an upper limit of the range is a value less than a maximum of the mutual coupling coefficient between the power transmitting inductor and the power receiving inductor, and wherein when the foreign matter is detected by the sensor, the control circuitry is configured to control the mechanism to move the movable member to remove the foreign matter.

14. The power receiving apparatus according to claim 13, further comprising communicating circuitry configured to communicate with the power transmitting apparatus to obtain information on a transmitted voltage and a transmitted current in the power transmitting apparatus, wherein the control circuitry computes the mutual coupling coefficient, based on a received voltage and a received current in the power receiving apparatus and the transmitted voltage and the transmitted current in the power transmitting apparatus.

15. The power receiving apparatus according to claim 13, wherein:

the adjustment circuit comprises first to Mth adjustment circuits, the first to Mth adjustment circuits converting voltage received by the power receiving inductor, the power receiving apparatus further comprises adjustment circuit switching circuitry configured to select one of the first to Mth adjustment circuits, voltage conversion ratios of the first to Mth adjustment circuits decrease in order from the first to Mth adjustment circuits, where M is an integer greater than or equal to 2, and the adjustment circuit switching circuitry is configured to select an adjustment circuit with a smaller number among the first to Mth adjustment circuits for a higher mutual coupling coefficient.

16. A control apparatus for controlling a power transmitting apparatus and a power receiving apparatus, the power transmitting apparatus including:
 a power supply configured to generate AC power; and
 a power transmitting inductor coupled to the power supply and configured to generate a magnetic field depending on the AC power generated by the power supply, the power receiving apparatus including:

a power receiving inductor configured to receive the AC power through magnetic coupling with the magnetic field generated by the power transmitting inductor; and
 an adjustment circuit coupled to the power receiving inductor and configured to supply the AC power received by the power receiving inductor to a load, and the control apparatus comprising:
 a sensor configured to detect, based on a change in temperature or in weight, foreign matter contacting with one of the power transmitting inductor and the power receiving inductor;
 a movable member movable in a longitudinal or a lateral direction of the one of the power transmitting inductor and the power receiving inductor;
 a mechanism coupled with the movable member and at least one of the power transmitting inductor and the power receiving inductor and configured to change at least one of an angle and a position between the power transmitting inductor and the power receiving inductor; and
 control circuitry configured to control the mechanism based on a mutual coupling coefficient between the power transmitting inductor and the power receiving inductor to change an angle or a position of at least one of the power receiving inductor and the power transmitting inductor to thereby change the angle or the position between the power transmitting inductor and the power receiving inductor, and configured to set the mutual coupling coefficient within a range, wherein an upper limit of the range is a value less than a maximum of the mutual coupling coefficient between the power transmitting inductor and the power receiving inductor, and wherein when the foreign matter is detected by the sensor, the control circuitry is configured to control the mechanism to move the movable member to remove the foreign matter.

17. The control apparatus according to claim 16, wherein the control circuitry computes the mutual coupling coefficient, based on a received voltage and a received current in the power receiving apparatus and a transmitted voltage and a transmitted current in the power transmitting apparatus.

* * * * *